April 25, 1939.  B. H. SPERBER  2,155,806

MULTIFOCAL EYEGLASS FRAME

Filed Feb. 1, 1938

BENJAMIN H. SPERBER
INVENTOR

BY *Victor J. Evans & Co.*
ATTORNEYS

Patented Apr. 25, 1939

2,155,806

UNITED STATES PATENT OFFICE 2,155,806

MULTIFOCAL EYEGLASS FRAME

Benjamin H. Sperber, Brooklyn, N. Y.

Application February 1, 1938, Serial No. 188,160

3 Claims. (Cl. 88—49)

This invention relates to improvements in spectacle frames and more especially to a new and improved type of spectacle frame particularly adapted for use in conjunction with multifocal lenses.

It is well known amongst those skilled in this art that users of multi-focal lenses, particularly those of the so-called bi-focal type, often experience considerable eye strain and fatigue during the use of the lens for reading purposes inasmuch as it is often necessary to hold the head at an unnatural angle in order that the line of vision may pass through the proper portion of the segmental reading glass.

A further inconvenience experienced in bi-focal lenses, occurs while walking. The user of this type lens, and while walking, must refrain from looking through the bi-focal portion of the lens, since the surrounding objects will become distorted as viewed from a different vision, thereby creating a sensation of falling or the vision of unnatural objects and the like.

It is among the more important objects of the present invention to provide a new and improved type of eyeglass mounting wherein means are provided for adjusting the mounting upon the face of the user permitting interposition of the segmental reading glass into the normal line of vision when desired.

It is also an object of the present invention to provide an eyeglass mounting of the type indicated wherein different portions of the eyeglass lens can be interposed in the normal line of vision by means of simple adjustment of the guard forming a part of the mounting whereby the mounting, as a unit, can be vertically moved relative to the face of the user.

Noteworthy among the features of the device according to the present invention are that it can be held in one of several positions during the course of its vertical movement whereby compensation can be made for variations in the physiognomy of different users. It will be apparent, of course, that by this means it is possible to adjust the multi-focal eyeglass for different positions. In reading, for example, it will be seen that if the vertical movement of the eyeglass be, for instance, three units with intermediate positions corresponding to one and two units, that the lowest angle at which the segmental reading portion of the eyeglass can be profitably utilized will be limited by the line of vision through said segment when the members are in the position corresponding to the beginning of the first unit, that is to say so-called zero position. The highest point at which the device can be profitably utilized will correspond to the field of vision when the device is at the position corresponding to the third unit, it being of course noted that intermediate positions can be accommodated by adjustment of the eyeglass mounting to positions corresponding to first or second units or intermediate values thereof.

It is also among the features of the new and improved spectacle frame according to the present invention that the adjustment means are substantially unnoticeable to the casual observer and do not increase the bulk or essentially alter the appearance of the spectacles, as contrasted to devices of this character heretofore known wherein the adjustment means have been cumbersome and bulky.

A further and, from a technical standpoint, an essentially notable feature of the device according to the present invention is that it can be easily and cheaply fabricated from materials commonly available and/or now in use in the manufacture of spectacle frames, whereby the cost of the new and improved adjustable structure forming the matter of the present invention is no greater than the old type unadjustable frame.

It is also to be observed that in addition to the economies attendant upon the manufacture of eyeglass mountings according to the present invention are other economies which result from the simplicity of construction and operation whereby the cost of repair is at least largely minimized.

Other objects, advantages and features of the device according to the present invention will be apparent to those skilled in the art during the course of the following description wherein a specific embodiment of the present invention, herein illustrated, will be described, it being clearly understood however that the illustrated preferred embodiment is given solely by way of example and is non-limitative.

Regarded in certain of its broader aspects, the novel eyeglass nose piece according to the present invention comprises a nose pad associated with the lens mounting proper by means including a pin and slot, said slot having cutaway portions formed therein whereby said pin can be received and substantially firmly held in one or several positions along said slot or in cutaway parts adjacent thereto, thus permitting the nose pad to be moved relative to the bridge proper. It will be observed that inasmuch as the nose pad engages with the nose of the user, movement of said nose pad or pads as the case may be, will be reflected in vertical movement of bridge proper and vertical movement of the associated eyeglass lenses, thereby shifting said segmental reading portions of said lenses from lower into raised position.

In order to facilitate a fuller and more complete understanding of the matter of the present invention the illustrated embodiment thereof will be hereinafter described.

Figure 1:
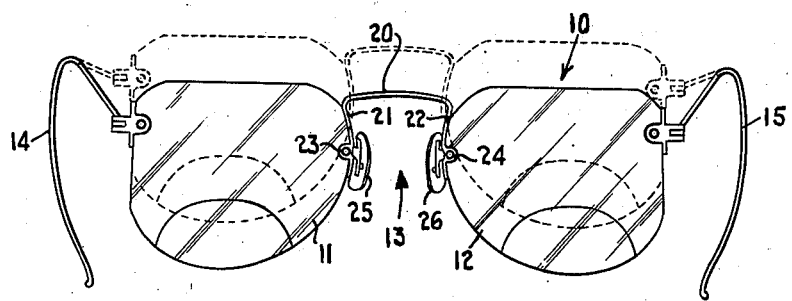
Fig. 1 is substantially a front elevational view of one form of eyeglasses embodying the matter of the present invention.
Figure 2:
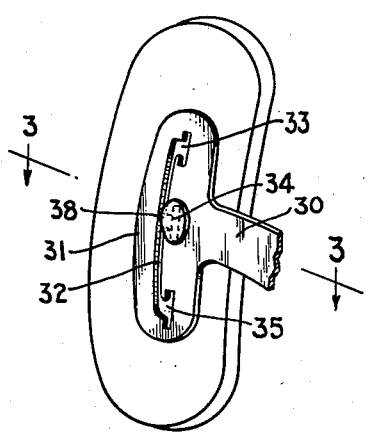
Fig. 2 is essentially a perspective view of one of the nose piece components illustrated in Fig. 1.
Figure 3:
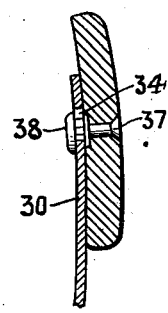
Fig. 3 is a sectional view of Fig. 2 taken along the line 3—3.
Figure 5:
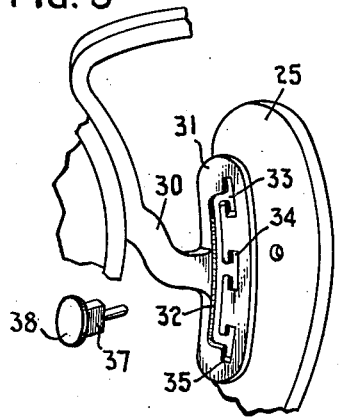
Fig. 5 is an exploded perspective view of a portion of the mounting showing the guard arm and associated nose pad.

Referring now to Figs. 1, 2 and 3, it will be observed that eyeglasses generally designated at 10, comprising lenses 11 and 12 associated by means including a bridge mounting generally designated at 13, can be carried on the head of the user by means comprising temples 14 and 15. The bridge 13 comprises a cross-bar 20 having dependent end portions 21 and 22 attached to the lenses by fastening means 23 and 24. Near the lower portion of said dependent end parts 21 and 22 is provided a lug adapted to engage with and support the nose pads 25 and 26, substantially as shown. Referring now to Figs. 2, 3 and 5 wherein details of the bridge construction are best illustrated, it being understood of course that although one nose pad only is shown two usually cooperate to form the nose piece assembly, it will be seen that the guard arm 30 formed on the dependent end portion of the bridge member, is formed to present a substantially flat tab portion generally designated at 31 having a slot-like opening 32 formed therein and extending along at least a major portion thereof. Said slot 32 communicates with a plurality of cutaway portions 33, 34 and 35 corresponding to end and intermediate parts of said slot, substantially as shown. The nose pad proper is provided with a pin 37 substantially fixedly mounted therein and having a projecting end portion slidably receivable in said slot 32 and held in position by means including a head portion 38. It is preferred that the portion of pin 37 positionable within the slot 32 be substantially rectangular in outline whereby rotative movement of the pin and associated nose pad is at least largely precluded. The rectangular outline of the upper portion of the pin also assists in holding the pad in fixed relationship relative to the nose piece proper, inasmuch as cutaway portions 33, 34 and 35 are provided with square-cut recesses adapted to receive and engage with said rectangular portions of said pin. It will be seen, then, that when desired the nose pad can be moved to position the pin 37 in one of the cutaway portions 33, 34 and 35 communicating with the slot 32, whereby the eyeglasses can be moved in position relative to the field of vision of the user, for instance, one position would correspond to that shown in full line in Fig. 1 and another position to correspond to that shown in phantom in Fig. 1. It is noticeable, however, that while the position of the lenses 11 and 12 will be changed relative to the field of vision of the user, the nose pads will remain in their normal position on the nose.

Figure 4:
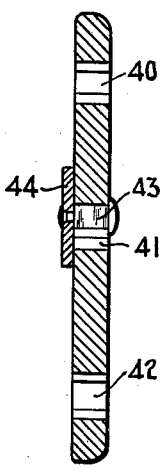
Fig. 4 is a vertical sectional view of an alternative or modified form of the present invention.

The modified form of structure illustrated in Fig. 4 is substantially the same as the structure illustrated in Figs. 1 to 3 inclusive, except that the slot 32 is formed in the pad itself whereby cutaway portions 40, 41 and 42 are provided, engageable with a rectangular shaped capped pin 43 mounted in the end of the guard arm 44 associated with the nose piece, similar to the guard arm 30 in the hereinabove described embodiment.

It will be seen that an eyeglass frame prepared in accordance with the present invention can be readily adjusted by the user thereof to cause the interposition of different portions of the eyeglass lens within the field of view of the user by positioning the pin within one of the several cutaway portions communicating with the slot formed either in said guard arm or said pad as hereinabove described. It will be observed, too, that in each instance engagement of the pin with square cut formations in the cutaway parts substantially firmly locks the members in cooperative relationship.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An adjustable frame for multi-focal eyeglasses including a nose piece comprising a cross member having downwardly extending end portions defining side elements of said nose piece, nose plate elements, adjustable mounting means associating said side elements and said plate elements comprising a flat headed pin substantially rectangular in cross-sectional outline carried on one of said elements slidably received in a slot-like opening formed in another element, and means for substantially firmly holding said pin at intermediate positions in said slot comprising cutaway portions communicating with said slot and having square-cut formations adapted to engage with parts of and slidably hold said rectangular shaped pin whereby relative rotative movement of said pin will be at least mostly precluded.

2. An adjustable frame for multi-focal eyeglasses including a nose piece comprising a cross member having downwardly extending end portions, nose plate members, adjustable mounting means associating said end portions and said plate members comprising a flat headed pin substantially rectangular in cross-sectional outline relatively fixedly mounted on each of said nose plate members slidably received in a slot-like opening formed in said end portions of said nose piece, and means for substantially firmly holding said pin at intermediate positions in said slot comprising cutaway portions communicating with said slot and having square-cut formations adapted to engage with parts of and slidably hold said rectangular shaped pin whereby relative rotative movement of said nose plate members with respect to said nose piece will be at least largely precluded without interfering with relative sliding movement thereof.

3. An adjustable frame for multi-focal eyeglasses including a nose piece comprising a cross member having downwardly extending end portions, nose plate members, adjustable mounting means associating said end portions of said nose piece and said plate members comprising a flat headed pin substantially rectangular in cross-sectional outline substantially fixedly mounted on each of said end portions slidably received in a slot-like opening formed in one of said nose plates, and means for substantially firmly holding said pin and associated nose piece at intermediate positions in said slot comprising cutaway portions formed in said plate member communicating with said slot and having square-cut formations adapted to engage with parts of and slidably hold said rectangular shaped pin.

BENJAMIN H. SPERBER.